U. A. TAVI.
UNIVERSAL ADJUSTABLE SUPPORT.
APPLICATION FILED NOV. 7, 1918.
1,300,045.
Patented Apr. 8, 1919.
2 SHEETS—SHEET 2.
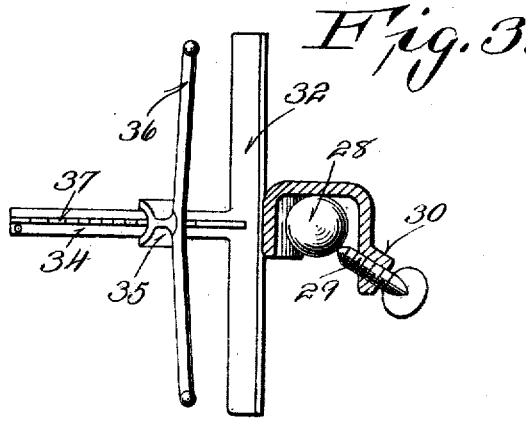
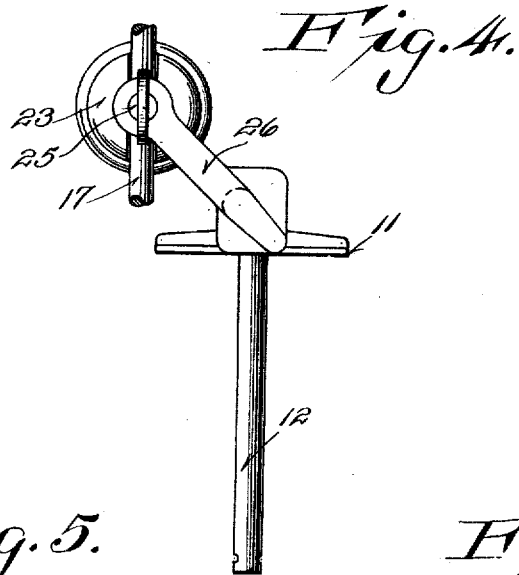
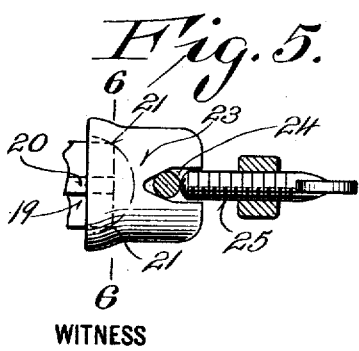
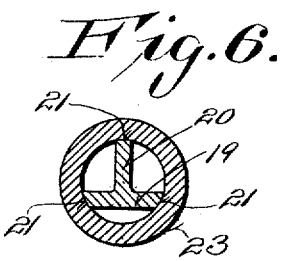
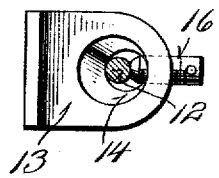
WITNESS
J. F. Britt
INVENTOR
Uno A. Tavi
BY Young & Young
ATTORNEY

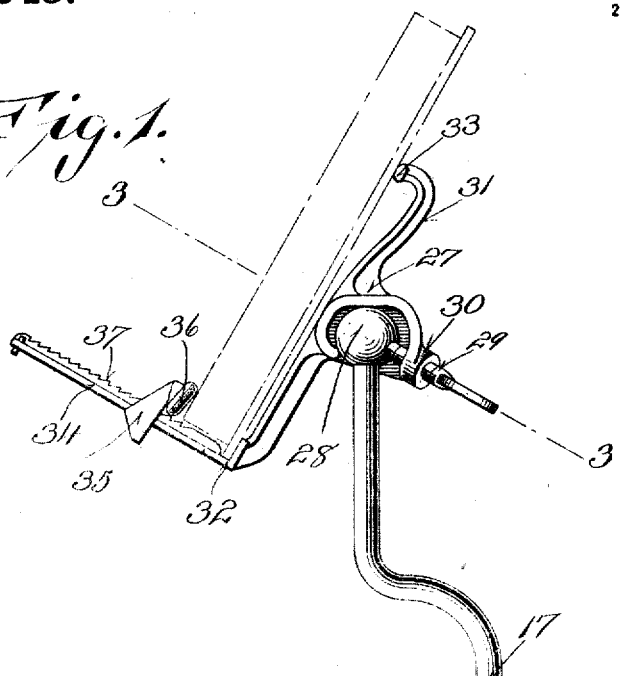
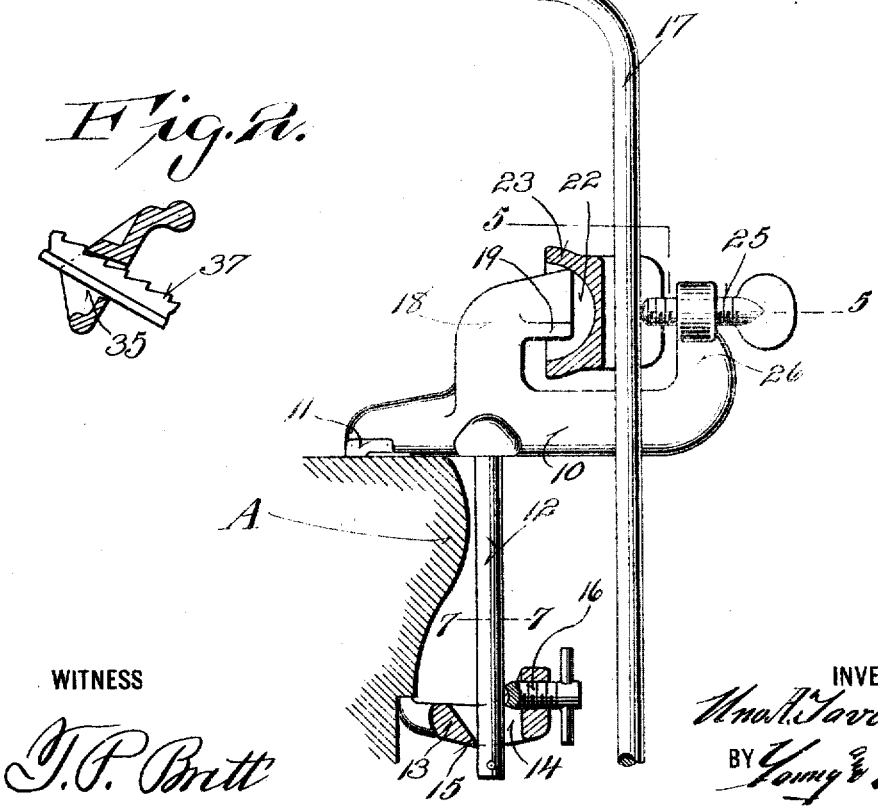

UNITED STATES PATENT OFFICE.

UNO A. TAVI, OF MILWAUKEE, WISCONSIN.

UNIVERSAL ADJUSTABLE SUPPORT.

1,300,045.   Specification of Letters Patent.   Patented Apr. 8, 1919.

Application filed November 7, 1918.   Serial No. 261,476.

*To all whom it may concern:*

Be it known that I, UNO A. TAVI, a citizen of Finland, and resident of Milwaukee, in the county of Milwaukee and State of Wisconsin, have invented certain new and useful Improvements in Universal Adjustable Supports; and I do hereby declare that the following is a full, clear, and exact description thereof.

My invention relates to new and useful improvements in supporting devices for books or other articles, and more particularly of that type providing for universal adjustment of the article supporting portion of the device with respect to the attaching portion of the device, and adapted for detachable clamping attachment to a chair seat, bedside rail or other structure.

It is in general the object of my invention to simplify and otherwise improve the structure, to increase the range of adjustment of devices of this character and to increase the convenience with which such devices may be manipulated particularly with respect to the procurement of the various desired adjustments.

It is more specifically an important object of my invention to provide an arrangement wherein the vertical and angular adjustments of the support standard with respect to the attaching member may be procured simultaneously and with the manipulation of a single clamping screw.

A still further object resides in the provision of a readily detachable adjustable connection for the article holding member of the device.

A still further object resides in the provision of an arrangement particularly in the universal joint connections wherein the necessity of machining to procure interfitting spherical surfaces is avoided.

With the above and other objects and advantages in view, which will be apparent as the description proceeds, my invention resides in the novel features of construction, combination and arrangement of parts as hereinafter described and defined by the appended claims.

In the accompanying drawings:

Figure 1 is an elevational view of a supporting device embodying my invention, portions thereof being broken away to more clearly show the structure.

Fig. 2 is a detail vertical sectional view taken centrally through the book retainer of the device.

Fig. 3 is a sectional view through the book holder on the line 3—3 of Fig. 1.

Fig. 4 is an end elevational view of the adjustable standard connection.

Fig. 5 is a detail sectional view on the line 5—5 of Fig. 1.

Fig. 6 is a detail sectional view on the line 6—6 of Fig. 5, and

Fig. 7 is a detail sectional view on the line 7—7 of Fig. 1.

Referring now more particularly to the accompanying drawings, the attaching member of my device comprises a clamping block 10 having a clamping cross head 11 at one end. A rod 12 is secured to the intermediate portion of the clamping block, preferably by being cast in the block, and extends perpendicular to the plane of the clamping head 11. The head end portion of the block thus forms a rigid clamping jaw, and a sliding clamping jaw 13 is loosely mounted on the rod, said jaw having an opening 14 therethrough which receives the rod and which is beveled at its side adjacent the clamping end of the jaw to provide a fulcrum edge 15 engageable with the rod. The rear end of the jaw is extended inwardly of the clamping end portion thereof and has threaded therein a clamping screw 16, the axis of said clamping screw being disposed adjacent the plane of the clamping face of the jaw and considerably inwardly of the fulcrum edge 15. The inner end of the screw is cupped to insure positive clamping engagement with the rod. Thus, when the screw 16 is loosened, the clamping jaw 13 may be readily slid upon the rod to procure its approximate clamping position with relation to the clamping head 11 of the fixed jaw, and in Fig. 1 of the drawings the fixed jaw is shown as resting on the top of the edge portion of a chair seat A or other support, with the clamping end of the sliding jaw 13 engaged against a molding ledge or other undersurface portion of the support. Thus as the screw 16 is turned inwardly, the jaw will be held against sliding movement on the rod by engagement of the screw and fulcrum edge 15 with opposite portions of the rod. At the same time, by reason of the inward offset of the screw with respect to said fulcrum edge, a rocking action of the jaw will be set up which will swing the clamping edge of the jaw inwardly to procure the necessary clamping action with respect to the support A.

An exceedingly simple clamping device is thus procured, which may be most economically manufactured. At the same time, a most positive securement is afforded, together with a most rapid manipulation for coaction with supporting members of different thicknesses, in contradistinction to those types of clamping devices wherein the entire adjustment of the movable jaw is procured by a screw action.

To connect the standard 17 of the support device with the clamp block 10 in such manner as to permit universal pivotal and longitudinally slidable adjustment, an upstanding arm 18 is formed on the clamp block and carries a horizontal flange 19 from the intermediate portion of which rises a vertical flange 20. The outer corners of these flanges form three substantially equally spaced abutment points 21 engageable in a spherical cavity 22 formed in one side of an adjustment block 23. The other side of the adjustment block is provided with an open channel-way 24 receiving the standard 17, the bottom of the channel-way being V-shaped in cross section to afford maximum friction contact with the standard. A set screw 25 is threaded in an arm 26 upstanding at the outer end of the clamp block 10 and engages the standard within the channel of the block 23. Thus, the standard, the block 23 and the block 10 may be clamped together.

It is noted that the arms 18 and 26 lie in a plane disposed at an angle of approximately 45° to the plane of the clamping head 11. Thus, in the normal vertical position of the standard when held by the adjustment block, the standard is spaced considerably to one side of the clamp block, and suitable pivotal adjustment of the standard in a plane at right angles to the plane of the clamping block may be permitted, to meet differing conditions of use of the device. Thus pivotal adjustment in this plane, as well as in any other plane desired is procured by moving the adjustment block about the lateral flange portions of the arm 18. It is noted that the axis of the screw 25 lies inwardly of the triangle of the three abutment points 21. Hence, said screw serves to hold the clamping block in any position of adjustment, at the same time that it holds the standard within the channel of the clamping block, the standard being obviously slidable in the channel for longitudinal adjustment thereof to determine the general height at which a desired article is to be supported. The sliding and angular adjustments of the standard are thus procurable simultaneously and by the use of a single binding screw.

The standard 17 is adapted to carry any article to be supported, such as a book or tray, and in the present instance the standard mounts a book carrier. Whichever type of carrier is provided, it includes an adjusting head 27 in the form of a hollow casting open at one side and at its bottom to detachably receive a spherical head 28 on the upper end of the standard. A screw 29 is threaded in an extended portion 30 at the rear side of the head 27 and extends diagonally into the head for engagement against the spherical head 28. Thus, a four-point binding contact of the head 28 is procured, said head being in bearing engagement with the remaining sides of the head 27 and the top thereof, and with the screw. The article carrying member may thus be adjusted to assume any desired angle, and to compensate for angular adjustment of the standard.

In the present arrangement, the adjusting head 27 is carried by the intermediate portion of a bar 31 which carries an angular book seating ledge 32 at its lower end and lateral supporting arms 33 at its upper end. To hold a book in open position on the carrier, an arm 34 projects forwardly from the central portion of the book seating ledge 32 and slidably mounts a collar 35 carrying laterally extending leaf engaging arms 36. A series of ratchet teeth 37 is formed on the upper surface of the arm 34, and the outer portion of the sleeve is beveled to engage said teeth when it is rocked by outward pressure exerted on the arms 36. Thus the leaf holder may be slid inwardly to engage the leaves and will automatically lock against undesired outward movement, such outward movement being readily procurable by suitable manipulation.

An exceedingly simple, positive and most readily manipulated supporting device has thus been provided, which is capable of universal adjustment in accordance with its desired conditions of use. It is noted that the adjusting head 27 of the carrier and the arm 18 of the clamping block both afford clamping portions for the opposed spherical surfaces of connecting portions of my device, in such manner as to avoid the necessity of machining.

While I have shown my device as attached to a chair seat, it is obvious that it may be attached to any other desired support, and that if necessary, supplemental devices may be provided to which the clamp may be attached.

What is claimed is:

1. A universally adjustable support including an attaching member having an abutment portion, an adjustment block having a hemispherical recess receiving said abutment portion, a standard carried by the adjustment block, an article carrying member on the standard, and a screw carried by the attachment member and engageable with the adjustment block to bind it in various positions against the abutment portion.

2. A universally adjustable support including an attaching member having an abutment portion, an adjustment block having a hemispherical recess receiving said abutment portion, and provided in its opposite portion with an open channel, a standard disposed in the channel, a carrying member on the standard, and a screw carried by the attachment member and engageable with the standard in the channel whereby to adjustably hold both the standard and the adjustment block.

3. A universally adjustable support including an attachment member having three abutment points, an adjustment block provided with a hemispherical cavity receiving the abutment points, a standard secured to the adjustment block, a carrying member on the standard, and a screw carried by the attachment member in opposition to the abutment points for clamping the adjustment block thereagainst, said screw having its axis disposed inwardly of the triangle of the abutment points.

4. A universally adjustable support including an attachment member, a pair of arms extending upwardly and laterally from said attachment member, inwardly directed flanges on one of said arms forming abutment points at their outer corners, an adjustment block provided with a hemispherical cavity receiving the outer portions of the flanges and provided with an open channel in its opposite portion, a standard slidably mounted in the channel and disposed at one side of the attachment member, a carrying member on the standard, and a screw threaded in the other arm of the attachment member and engaging the standard in the adjustment block.

5. An adjustable support of the class described comprising a clamping head, a standard carried thereby, an article carrying member on the standard, a rod extending from the clamping head, a clamping jaw slidably and tiltably mounted on the rod, and a screw threaded in the clamping jaw and engageable with the rod to bind the jaw on the rod and simultaneously rock said jaw inwardly for clamping co-action with the head.

6. An adjustable support of the class described comprising a clamping head, a standard carried thereby, an article carrying member on the standard, a rod extending from the clamping head, a clamping jaw provided with an opening loosely receiving the rod and having its side adjacent the clamping surface of the jaw beveled to provide a fulcrum, and a screw threaded in the remote portion of the jaw and engageable with the rod to bind the jaw on the rod and simultaneously rock the clamping surface of the jaw inwardly for coaction with the clamping head.

7. A universally adjustable support including a clamping block having a transverse clamping head at one end, a rod depending from the intermediate portion of the block, a clamping jaw adjustably carried by the rod for coöperation with the block, an arm upstanding on the remote end portion of the block, an arm upstanding on the intermediate portion of the block, flanges on the second named arm extended toward the first named arm and forming abutment points, an adjustment block provided with a spherical cavity receiving said abutment points and provided with an open channel, a standard slidably mounted in the channel, a carrying member on the standard, and a screw threaded in the first named arm and engaging the standard in the adjustment block.

In testimony that I claim the foregoing I have hereunto set my hand at Milwaukee, in the county of Milwaukee and State of Wisconsin.

UNO A. TAVI.

Copies of this patent may be obtained for five cents each, by addressing the "Commissioner of Patents, Washington, D. C."